United States Patent
Tange

(10) Patent No.: US 8,179,099 B2
(45) Date of Patent: May 15, 2012

(54) BATTERY STATE MONITORING CIRCUIT AND BATTERY DEVICE

(75) Inventor: Yoshihisa Tange, Chiba (JP)

(73) Assignee: Seiko Instruments Inc., Chiba (JP)

( * ) Notice: Subject to any disclaimer, the term of this patent is extended or adjusted under 35 U.S.C. 154(b) by 442 days.

(21) Appl. No.: 12/582,405

(22) Filed: Oct. 20, 2009

(65) Prior Publication Data

US 2010/0097033 A1    Apr. 22, 2010

(30) Foreign Application Priority Data

Oct. 21, 2008  (JP) ................................. 2008-270967
Sep. 7, 2009   (JP) ................................. 2009-206359

(51) Int. Cl.
*H02J 7/00* (2006.01)
(52) U.S. Cl. .......................... 320/134; 320/163; 324/434
(58) Field of Classification Search .................. 320/116, 320/134, 136, 162, 163; 324/434
See application file for complete search history.

(56) References Cited

U.S. PATENT DOCUMENTS

| 6,690,559 B2* | 2/2004 | Yoshida | 361/100 |
| 2008/0111520 A1* | 5/2008 | Sasaki | 320/134 |
| 2009/0058365 A1* | 3/2009 | Goto | 320/134 |

FOREIGN PATENT DOCUMENTS

JP   2007-218680 A   8/2007

* cited by examiner

*Primary Examiner* — Edward Tso
*Assistant Examiner* — Aaron Piggush
(74) *Attorney, Agent, or Firm* — Brinks Hofer Gilson & Lione

(57) ABSTRACT

Provided is a battery state monitoring circuit including a control circuit that applies, to a gate of a signal output transistor provided at a terminal for transmitting an overcharge detection signal, a potential at which the signal output transistor is turned off at a voltage lower than a minimum circuit operating voltage. Accordingly, in a battery device that uses the cascade-connected battery state monitoring circuits, charge is inhibited securely even at a power supply voltage lower than the minimum circuit operating voltage.

6 Claims, 4 Drawing Sheets

US 8,179,099 B2

BATTERY STATE MONITORING CIRCUIT AND BATTERY DEVICE

RELATED APPLICATIONS

This application claims priority under 35 U.S.C. §119 to Japanese Patent Application Nos. JP2008-270967 filed on Oct. 21, 2008 and JP2009-206359 filed on Sep. 7, 2009, the entire contents of which are hereby incorporated by reference.

BACKGROUND OF THE INVENTION

1. Field of the Invention

The present invention relates to a battery state monitoring circuit that detects a voltage and an abnormality of a secondary battery including a nickel hydrogen battery and a lithium ion battery, and more particularly, to a battery state monitoring circuit capable of controlling charge and discharge to and from a battery pack containing a plurality of the secondary batteries that are connected in series.

2. Description of the Related Art

Nowadays, a secondary battery is used as power supply to a portable electronic device including a mobile phone, a notebook computer, and a portable game device. A lithium ion secondary battery is the mainstream of the secondary battery because of its light weight and its high energy density. The secondary battery has a risk of electrolyte leakage as a result of battery expansion after the battery has been charged excessively (overcharged). Besides, characteristics of the battery itself deteriorate after the battery has been discharged excessively (overdischarged). In view of the above, there is employed a protection circuit that protects the secondary battery from being overcharged and overdischarged. In particular, the lithium ion secondary battery is vulnerable to the overcharge and the overdischarge, and hence the protection circuit absolutely needs to be used for the lithium ion secondary battery.

Of portable electronic devices, there is used, for a notebook computer, a battery pack in which a plurality of batteries are connected in parallel and the parallel-connected batteries are connected in series. In a case of using the lithium ion secondary batteries in the battery pack, all of the batteries connected in series need to be monitored by protection circuits. Most of the battery packs used for the notebook computers contain three or four secondary batteries that are connected in series (three-series connection or four-series connection). Accordingly, a protection IC for four-series connection that includes protection circuits for respectively monitoring four batteries is commercially available.

Further, also as to electric power tools that are driven with high voltage, products using lithium ion secondary batteries have been introduced on the market. Studies are being performed on the use of an eight-series battery pack for the electric power tool.

In such an application as described above, when charge/discharge is controlled by means of one battery state monitoring circuit, the battery state monitoring circuit is required to have high withstand voltage characteristics. Therefore, there is employed a configuration in which a battery state monitoring circuit is provided to each secondary battery to thereby prevent the battery state monitoring circuit from being applied with a voltage exceeding its withstand voltage characteristics (see, for example, JP 2007-218680 A).

FIG. 5 illustrates a circuit example of a conventional battery device. The conventional battery device includes, for each secondary battery, a battery state monitoring circuit including input terminals DCHI and CHGI. Each of the battery state monitoring circuits transmits monitoring information, to thereby control charge/discharge of a large number of the secondary batteries that are connected in series.

In the conventional battery state monitoring circuits, however, the transmitted monitoring information and detected monitoring information are output to output terminals DCHO and CHGO via AND circuits 510 and 516, to be transmitted to a next battery state monitoring circuit or drivers 605 and 606. Therefore, there arises a problem that, when a voltage of the secondary battery becomes lower than a minimum operating voltage of the logic circuits, voltages of the output terminals cannot be secured, which makes impossible to inhibit charge.

SUMMARY OF THE INVENTION

A battery state monitoring circuit and a battery device according to the present invention have been devised in order to solve the above-mentioned problem. In the battery device that uses the cascade-connected battery state monitoring circuits, it is possible to securely inhibit charge even at a voltage lower than a minimum circuit operating voltage.

To solve the conventional problem, each of the battery state monitoring circuits included in the battery device that uses the cascade-connected battery state monitoring circuits according to the present invention is provided with a circuit that applies, to a gate of a signal output transistor provided at a terminal for transmitting an overcharge detection signal, a potential at which the signal output transistor is turned off at the voltage lower than the minimum circuit operating voltage.

Therefore, at a power supply voltage lower than a voltage with which the circuit is not allowed to operate, it becomes possible to securely turn off a charge control transistor, to thereby inhibit charge.

According to the battery device including the battery state monitoring circuits of the present invention, in the battery device that uses the cascade-connected battery state monitoring circuits, there is an effect that charge is securely inhibited even at the power supply voltage lower than the minimum circuit operating voltage.

DETAILED DESCRIPTION OF THE PREFERRED EMBODIMENT

Figure 1:
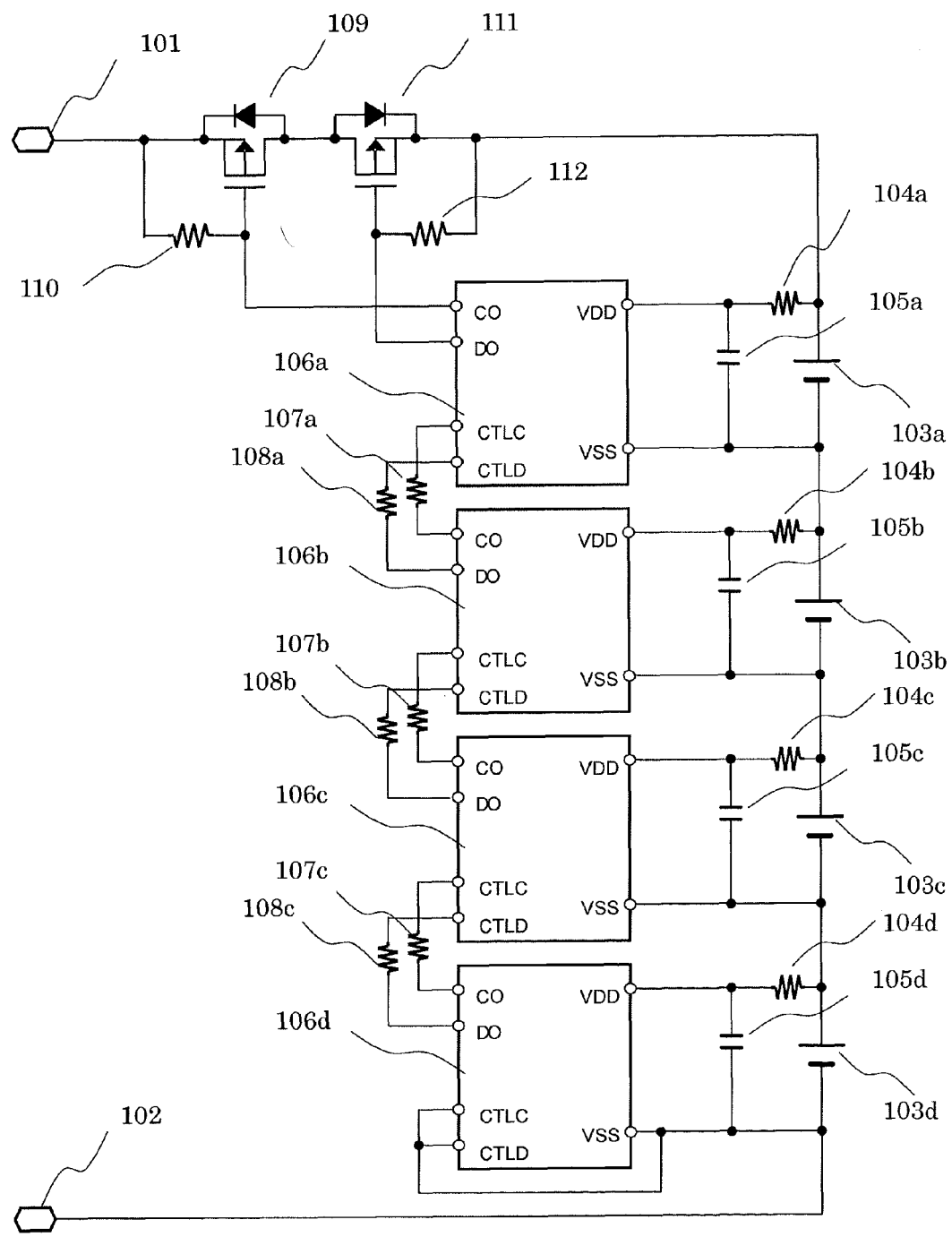
FIG. 1 illustrates a circuit diagram of a battery device according to the present invention.

FIG. 1 illustrates a circuit diagram of a battery device according to the present invention. The battery device of FIG. 1 includes a plurality of cascade-connected battery state monitoring circuits. For the sake of simple description, FIG. 1 illustrates the battery device including four battery state monitoring circuits that are connected in series. Note that also in a case of a battery device including five or more battery state monitoring circuits that are connected in series, the same circuit configuration is made in which the corresponding number of battery state monitoring circuits are cascade-connected.

The battery device of FIG. 1 includes four batteries 103a to 103d that are connected in series, four battery state monitoring circuits 106a to 106d that are individually provided in correspondence with the batteries 103a to 103d, resistors for communication terminal connection 107a to 107c and 108a to 108c, a first transistor (charging P-channel transistor) 109, a second transistor (discharging P-channel transistor) 111, a first resistive element (first bias resistive element) 110, a second resistive element (second bias resistive element) 112, a first external terminal 101, and a second external terminal 102.

The first transistor 109, the second transistor 111, and the batteries 103a to 103d are connected in series between the first external terminal 101 and the second external terminal 102. The batteries 103a to 103d are respectively provided with the battery state monitoring circuits 106a to 106d. A positive terminal of each of the batteries 103a to 103d is connected to a first voltage monitoring terminal VDD of each of the battery state monitoring circuits 106a to 106d while a negative terminal of each of the batteries 103a to 103d is connected to a second voltage monitoring terminal VSS of each of the battery state monitoring circuits 106a to 106d. The first resistive element 110 is connected between a gate terminal of the first transistor 109 and the first external terminal 101. The second resistive element 112 is connected between a gate terminal of the second transistor 111 and the positive terminal of the battery 103a.

The battery state monitoring circuit 106a provided on a highest potential side includes a first transmitting terminal CO connected to the gate terminal of the first transistor 109, and a second transmitting terminal DO connected to the gate terminal of the second transistor 111. Each of the battery state monitoring circuits 106b to 106d includes a first transmitting terminal CO and a second transmitting terminal DO that are respectively connected to a first receiving terminal CTLC and a second receiving terminal CTLD of a battery state monitoring circuit provided on a higher potential side. The first receiving terminal CTLC and the second receiving terminal CTLD of the battery state monitoring circuit 106d are connected to the negative terminal of the battery 103d.

All of the battery state monitoring circuits 106a to 106d have the same circuit configuration. Therefore, the circuit configuration is described with reference to FIG. 3 using a common battery state monitoring circuit 106.

The battery state monitoring circuit 106 includes an overcharge detection circuit 304, a first NOR circuit 306, a first output transistor 307, a first current source 308, a depletion transistor 309, a resistor 310, an overdischarge detection circuit 305, a second NOR circuit 311, a second output transistor 312, a second current source 313, the first voltage monitoring terminal VDD, the second voltage monitoring terminal VSS, the first transmitting terminal CO, the second transmitting terminal DO, the first receiving terminal CTLC, and the second receiving terminal CTLD.

The overcharge detection circuit 304 has one terminal connected to the first voltage monitoring terminal VDD, and another terminal connected to the second voltage monitoring terminal VSS. The first NOR circuit 306 has input terminals respectively connected to an output terminal of the overcharge detection circuit 304 and the first receiving terminal CTLC, and an output terminal connected to a gate terminal of the first output transistor 307. The first output transistor 307 is an N-channel metal-oxide semiconductor (MOS) transistor, and has a drain terminal connected to the first transmitting terminal CO and a source terminal connected to the second voltage monitoring terminal VSS. The first current source 308 is connected between the first voltage monitoring terminal VDD and the first receiving terminal CTLC. The depletion transistor 309 has a drain terminal connected to the gate terminal of the first output transistor 307, and a gate terminal and a source terminal that are saturation-connected by means of the resistor 310 to be connected to the second voltage monitoring terminal VSS.

The overdischarge detection circuit 305 has one terminal connected to the first voltage monitoring terminal VDD, and another terminal connected to the second voltage monitoring terminal VSS. The second NOR circuit 311 has input terminals respectively connected to an output terminal of the overdischarge detection circuit 305 and the second receiving terminal CTLD, and an output terminal connected to a gate terminal of the second output transistor 312. The second output transistor 312 is an N-channel MOS transistor, and has a drain terminal connected to the second transmitting terminal DO and a source terminal connected to the second voltage monitoring terminal VSS. The second current source 313 is connected between the first voltage monitoring terminal VDD and the second receiving terminal CTLD.

The battery state monitoring circuit 106 including the above-mentioned components is formed as a one-chip IC (semiconductor device). Note that the first NOR circuit 306, the first output transistor 307, and the first current source 308 together form an overcharge information communication circuit according to the present invention. Further, the second NOR circuit 311, the second output transistor 312, and the second current source 313 together form an overdischarge information communication circuit according to the present invention.

Next, an operation of the battery state monitoring circuit 106 is described.

The overcharge detection circuit 304 outputs a signal (overcharge detection signal) of high level when a voltage of the battery 103 becomes equal to or higher than an overcharge voltage, and outputs the signal of low level when the voltage of the battery 103 becomes lower than the overcharge voltage. In this case, the overcharge voltage refers to an upper limit chargeable voltage. Note that the overcharge detection circuit 304 has a function of stopping its own operation when receiving an overdischarge detection signal of high level from the overdischarge detection circuit 305.

The first NOR circuit 306 receives the overcharge detection signal from the overcharge detection circuit 304 and a signal from the first receiving terminal CTLC as inputs, and outputs a NOR signal between both the signals to the gate terminal of the first output transistor 307.

The overdischarge detection circuit 305 outputs the signal (overdischarge detection signal) of high level when the voltage of the battery 103 becomes lower than an overdischarge voltage, and outputs the signal of low level when the voltage of the battery 103 becomes equal to or higher than the overdischarge voltage. In this case, the overdischarge voltage refers to a lower limit dischargeable voltage.

The second NOR circuit 311 receives the overdischarge detection signal from the overdischarge detection circuit 305 and a signal from the second receiving terminal CTLD as inputs, and outputs a NOR signal between both the signals to the gate terminal of the second output transistor 312.

In the battery device having the above-mentioned configuration, a load or a charger is connected between the first external terminal 101 and the second external terminal 102, to thereby perform charge or discharge.

The battery device including the above-mentioned battery state monitoring circuits 106 controls charge/discharge of the batteries 103a to 103d through the following operation.

Description is given on a case of a normal state, that is, a case where all of the voltages of the batteries 103a to 103d fall within a voltage range lower than the overcharge voltage and a voltage range equal to or higher than the overdischarge voltage. In the normal state, the overcharge detection circuit 304 of the battery state monitoring circuit 106a outputs the overcharge detection signal of low level to the first NOR circuit 306.

On this occasion, the first output transistor 307 of the battery state monitoring circuit 106b has been turned on (the reason is described later), and hence the first receiving terminal CTLC of the battery state monitoring circuit 106a becomes low level. Accordingly, the first NOR circuit 306 outputs the signal of high level to the gate terminal of the first output transistor 307. Then, the first output transistor 307 is turned on, and the first transmitting terminal CO becomes low level. As a result, the first transistor 109 is turned on.

The reason why the first output transistor 307 of the battery state monitoring circuit 106b has been turned on is described below. Because the first receiving terminal CTLC of the battery state monitoring circuit 106d provided at the lowermost stage is connected to the negative terminal of the battery 103d, the input terminal of the first NOR circuit 306 is always kept at low level. The overcharge detection circuit 304 outputs the overcharge detection signal of low level to the first NOR circuit 306. Accordingly, the first NOR circuit 306 outputs the signal of high level to the gate terminal of the first output transistor 307, and then the first output transistor 307 is turned on. The first transmitting terminal CO of the battery state monitoring circuit 106d becomes low level. This signal that has been output from the first transmitting terminal CO of the battery state monitoring circuit 106d is transmitted one stage by one stage, and as a result, the first output transistor 307 of the battery state monitoring circuit 106b is turned on.

On the other hand, the overdischarge detection circuit 305 of the battery state monitoring circuit 106a outputs the overdischarge detection signal of low level to the second NOR circuit 311. On this occasion, the second output transistor 312 of the battery state monitoring circuit 106b has been also turned on, and hence the second receiving terminal CTLD of the battery state monitoring circuit 106a becomes low level. Accordingly, the second NOR circuit 311 outputs the signal of high level to the gate terminal of the second output transistor 312. Then, the second output transistor 312 is turned on, and the second transmitting terminal DO becomes low level. As a result, the second transistor 111 is turned on.

As described above, in the normal state, because the first transistor 109 and the second transistor 111 are turned on, the battery device becomes a chargeable and dischargeable state.

Next, description is given on a case of an overcharged state, that is, a case where the charger is connected between the first external terminal 101 and the second external terminal 102 to thereby charge the batteries 103a to 103d, and at least one voltage of the batteries 103a to 103d becomes equal to or higher than the overcharge voltage. Note that the case where the voltage of the battery 103b becomes equal to or higher than the overcharge voltage is described below.

In this case, the overcharge detection circuit 304 of the battery state monitoring circuit 106b outputs the overcharge detection signal of high level to the first NOR circuit 306. Then, the first NOR circuit 306 outputs the signal of low level to the gate terminal of the first output transistor 307. Accordingly, the first output transistor 307 is turned off, and the first transmitting terminal CO becomes high impedance.

On this occasion, the first receiving terminal CTLC of the battery state monitoring circuit 106a is pulled up to high level by means of the first current source 308, and the signal of high level is input to the first NOR circuit 306. Then, the first NOR circuit 306 outputs the signal of low level to the gate terminal of the first output transistor 307. Accordingly, the first output transistor 307 is turned off When the first output transistor 307 is turned off, the gate terminal of the first transistor 109 becomes high level by means of the first resistive element 110, and then the first transistor 109 is turned off. As a result, the charge from the charger is inhibited.

As described above, when the overcharge detection signal output from the battery state monitoring circuit corresponding to the battery that has become the overcharged state reaches the battery state monitoring circuit 106a provided at the uppermost stage, the first transistor 109 is turned off. As a result, the charge from the charger is inhibited.

Next, description is given on a case of an overdischarged state, that is, a case where the load is connected between the first external terminal 101 and the second external terminal 102 to thereby discharge the batteries 103a to 103d, and at least one voltage of the batteries 103a to 103d becomes lower than the overdischarge voltage. Note that the case where the voltage of the battery 103b becomes lower than the overdischarge voltage is described below.

In this case, the overdischarge detection circuit 305 of the battery state monitoring circuit 106b outputs the overdischarge detection signal of high level to the second NOR circuit 311. Then, the second NOR circuit 311 outputs the signal of low level to the gate terminal of the second output transistor 312. Accordingly, the second output transistor 312 is turned off, and the second transmitting terminal DO becomes high impedance.

On this occasion, the second receiving terminal CTLD of the battery state monitoring circuit 106a is pulled up to high level by means of the second current source 313, and the signal of high level is input to the second NOR circuit 311. Then, the second NOR circuit 311 outputs the signal of low level to the gate terminal of the second output transistor 312. Accordingly, the second output transistor 312 is turned off.

When the second output transistor 312 is turned off, the gate terminal of the second transistor 111 becomes high level by means of the second resistive element 112, and then the second transistor 111 is turned off. As a result, the discharge to the load is inhibited.

As described above, when the overdischarge detection signal output from the battery state monitoring circuit corresponding to the battery that has become the overdischarged state reaches the battery state monitoring circuit 106a provided at the uppermost stage, the second transistor 111 is turned off. As a result, the discharge to the load is inhibited.

The operation described above is performed in a case where the battery voltage is equal to or higher than a circuit operating voltage.

Next, description is given on an operation for securely inhibiting charge in a case where the battery voltage is lower than a voltage with which the first NOR circuit 306 is allowed to operate. In the circuit configuration described above, if a power supply voltage decreases to be a voltage with which driving performance of a transistor is not sufficiently secured, a signal output from the first NOR circuit 306 becomes undetectable. As a result, an output signal of the first output transistor 307 becomes undetectable.

Figure 3:
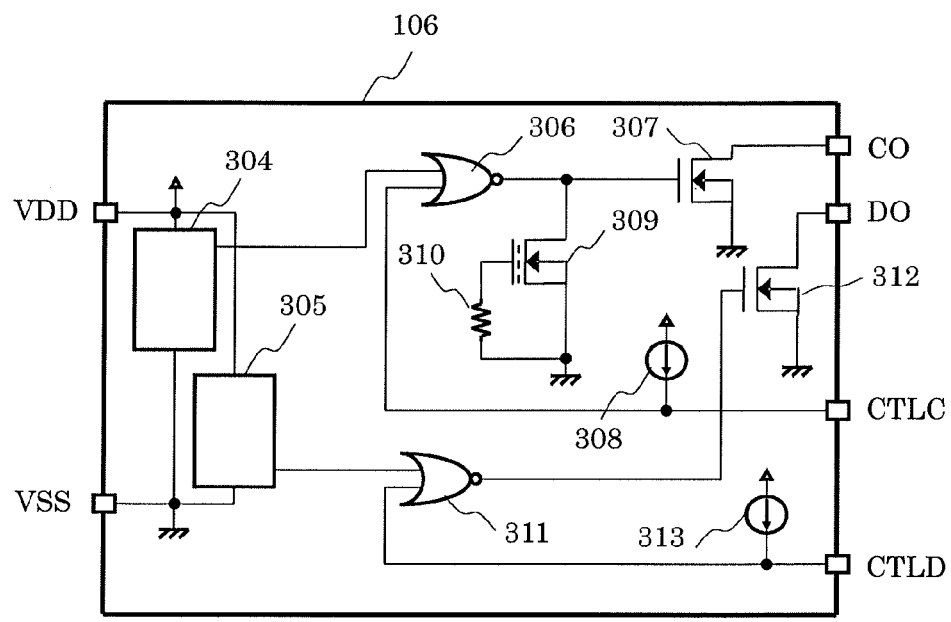
FIG. 3 illustrates a circuit diagram of a battery state monitoring circuit used in the battery device of FIG. 1 according to the present invention.

Therefore, as illustrated in FIG. 3, to form a control circuit that controls the first output transistor 307 to be turned on, the drain terminal of the saturation-connected depletion transistor 309 is connected to the gate terminal of the first output transistor 307. In this configuration, when the power supply voltage is lower than the voltage with which the first NOR circuit 306 is allowed to operate, it becomes possible to make low level the gate terminal of the first output transistor 307. As a result, it becomes possible to securely turn off the first output transistor 307.

Needless to say, when the first NOR circuit 306 operates normally, in order to control the state of the gate terminal of the first output transistor 307, driving performance of an output stage of the first NOR circuit 306 needs to be set higher than driving performance of the depletion transistor 309.

Note that the same effect can be expected also in a case where a resistive element is provided instead of the depletion transistor 309 that is saturation-connected by means of the resistor 310, though not illustrated.

Figure 2:
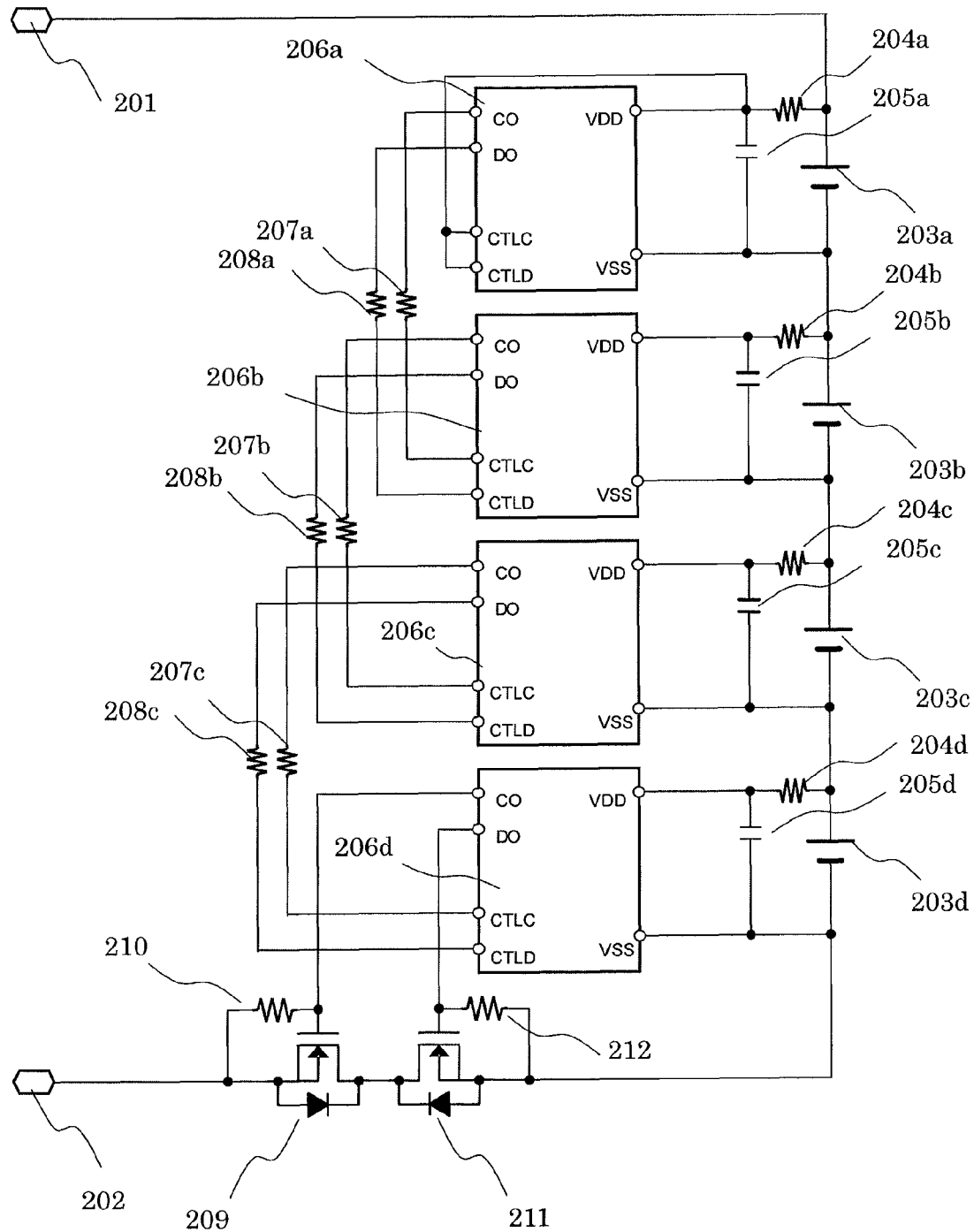
FIG. 2 illustrates a circuit diagram of a battery device according to the present invention.

Next, description is given on an example of a battery device that uses N-channel transistors as first and second transistors for respectively controlling charge/discharge. FIG. 2 illustrates a circuit diagram of another example of the battery device according to the present invention. For the sake of simple description, FIG. 2 illustrates the battery device including four battery state monitoring circuits that are connected in series. Note that also in a case of a battery device including five or more battery state monitoring circuits that are connected in series, the same circuit configuration is made in which the corresponding number of battery state monitoring circuits are cascade-connected.

The battery device of FIG. 2 includes four batteries 203a to 203d that are connected in series, four battery state monitoring circuits 206a to 206d that are individually provided in correspondence with the batteries 203a to 203d, resistors for communication terminal connection 207a to 207c and 208a to 208c, a first transistor (charging N-channel transistor) 209, a second transistor (discharging N-channel transistor) 211, a first resistive element (first bias resistive element) 210, a second resistive element (second bias resistive element) 212, a first external terminal 201, and a second external terminal 202.

The first transistor 209, the second transistor 211, and the batteries 203a to 203d are connected in series between the first external terminal 201 and the second external terminal 202. The batteries 203a to 203d are respectively provided with the battery state monitoring circuits 206a to 206d. A positive terminal of each of the batteries 203a to 203d is connected to a first voltage monitoring terminal VDD of each of the battery state monitoring circuits 206a to 206d while a negative terminal of each of the batteries 203a to 203d is connected to a second voltage monitoring terminal VSS of each of the battery state monitoring circuits 206a to 206d. The first resistive element 210 is connected between a gate terminal of the first transistor 209 and the second external terminal 202. The second resistive element 212 is connected between a gate terminal of the second transistor 211 and the negative terminal of the battery 203d.

The battery state monitoring circuit 206d provided on a lowest potential side includes a first transmitting terminal CO connected to the gate terminal of the first transistor 209, and a second transmitting terminal DO connected to the gate terminal of the second transistor 211. Each of the battery state monitoring circuits 206a to 206c includes a first transmitting terminal CO and a second transmitting terminal DO that are respectively connected to a first receiving terminal CTLC and a second receiving terminal CTLD of a battery state monitoring circuit provided on a lower potential side. The first receiving terminal CTLC and the second receiving terminal CTLD of the battery state monitoring circuit 206a are connected to the positive terminal of the battery 203a.

All of the battery state monitoring circuits 206a to 206d have the same circuit configuration. Therefore, the circuit configuration is described with reference to FIG. 4 using the common battery state monitoring circuit 206.

The battery state monitoring circuit 206 includes an overcharge detection circuit 404, a first OR circuit 406, a first output transistor 407, a first current source 408, a first INV circuit 414, a depletion transistor 409, a resistor 410, an overdischarge detection circuit 405, a second OR circuit 411, a second output transistor 412, a second current source 413, a second INV circuit 415, the first voltage monitoring terminal VDD, the second voltage monitoring terminal VSS, the first transmitting terminal CO, the second transmitting terminal DO, the first receiving terminal CTLC, and the second receiving terminal CTLD.

The overcharge detection circuit 404 has one terminal connected to the first voltage monitoring terminal VDD, and another terminal connected to the second voltage monitoring terminal VSS. The first OR circuit 406 has input terminals respectively connected to an output terminal of the overcharge detection circuit 404 and the first receiving terminal CTLC via the first INV circuit 414, and an output terminal connected to a gate terminal of the first output transistor 407. The first output transistor 407 is a P-channel MOS transistor, and has a drain terminal connected to the first transmitting terminal CO and a source terminal connected to the first voltage monitoring terminal VDD. The first current source 408 is connected between the second voltage monitoring terminal VSS and the first receiving terminal CTLC. The depletion transistor 409 has a drain terminal connected to the first voltage monitoring terminal VDD, and a gate terminal and a source terminal that are saturation-connected by means of the resistor 410 to be connected to the gate terminal of the first output transistor 407.

The overdischarge detection circuit 405 has one terminal connected to the first voltage monitoring terminal VDD, and another terminal connected to the second voltage monitoring terminal VSS. The second OR circuit 411 has input terminals respectively connected to an output terminal of the overdischarge detection circuit 405 and the second receiving terminal CTLD via the second INV circuit 415, and an output terminal connected to a gate terminal of the second output transistor 412. The second output transistor 412 is a P-channel MOS transistor, and has a drain terminal connected to the second transmitting terminal DO and a source terminal connected to the first voltage monitoring terminal VDD. The second current source 413 is connected between the second voltage monitoring terminal VSS and the second receiving terminal CTLD.

The battery state monitoring circuit 206 including the above-mentioned components is formed as a one-chip IC (semiconductor device). Note that the first OR circuit 406, the first output transistor 407, and the first current source 408 together form an overcharge information communication circuit according to the present invention. Further, the second OR circuit 411, the second output transistor 412, and the second current source 413 together form an overdischarge information communication circuit according to the present invention.

Next, an operation of the battery state monitoring circuit 206 is described.

The overcharge detection circuit 404 outputs a signal (overcharge detection signal) of high level when a voltage of the battery 203 becomes equal to or higher than an overcharge voltage, and outputs the signal of low level when the voltage of the battery 203 becomes lower than the overcharge voltage. In this case, the overcharge voltage refers to an upper limit chargeable voltage. Note that the overcharge detection circuit 404 has a function of stopping its own operation when receiving an overdischarge detection signal of high level from the overdischarge detection circuit 405.

The first OR circuit 406 receives the overcharge detection signal from the overcharge detection circuit 404 and a signal from the first receiving terminal CTLC via the first INV circuit 414 as inputs, and outputs an OR signal between both the signals to the gate terminal of the first output transistor 407.

The overdischarge detection circuit 405 outputs the signal (overdischarge detection signal) of high level when the voltage of the battery 203 becomes lower than an overdischarge voltage, and outputs the signal of low level when the voltage of the battery 203 becomes equal to or higher than the overdischarge voltage. In this case, the overdischarge voltage refers to a lower limit dischargeable voltage.

The second OR circuit 411 receives the overdischarge detection signal from the overdischarge detection circuit 405 and a signal from the second receiving terminal CTLD via the second INV circuit 415 as inputs, and outputs an OR signal between both the signals to the gate terminal of the second output transistor 412.

In the battery device having the above-mentioned configuration, a load or a charger is connected between the first external terminal 201 and the second external terminal 202, to thereby perform charge or discharge.

The battery device including the above-mentioned battery state monitoring circuits 206 controls charge/discharge of the batteries 203a to 203d through the following operation.

Description is given on a case of a normal state, that is, a case where all of the voltages of the batteries 203a to 203d fall within a voltage range lower than the overcharge voltage and a voltage range equal to or higher than the overdischarge voltage. In the normal state, the overcharge detection circuit 404 of the battery state monitoring circuit 206d outputs the overcharge detection signal of low level to the first OR circuit 406.

On this occasion, the first output transistor 407 of the battery state monitoring circuit 206c has been turned on (the reason is described later), and hence the first receiving terminal CTLC of the battery state monitoring circuit 206d becomes high level. Accordingly, the first OR circuit 406 outputs the signal of low level to the gate terminal of the first output transistor 407. Then, the first output transistor 407 is turned on, and the first transmitting terminal CO becomes high level. As a result, the first transistor 209 is turned on.

The reason why the first output transistor 407 of the battery state monitoring circuit 206c has been turned on is described below. Because the first receiving terminal CTLC of the battery state monitoring circuit 206a provided at the uppermost stage is connected to the positive terminal of the battery 203a, the input terminal of the first OR circuit 406 is always kept at low level. The overcharge detection circuit 404 outputs the overcharge detection signal of low level to the first OR circuit 406. Accordingly, the first OR circuit 406 outputs the signal of low level to the gate terminal of the first output transistor 407, and then the first output transistor 407 is turned on. The first transmitting terminal CO of the battery state monitoring circuit 206a becomes low level. This signal that has been output from the first transmitting terminal CO of the battery state monitoring circuit 206a is transmitted one stage by one stage, and as a result, the first output transistor 407 of the battery state monitoring circuit 206c is turned on.

On the other hand, the overdischarge detection circuit 405 of the battery state monitoring circuit 206d outputs the overdischarge detection signal of low level to the second OR circuit 411. On this occasion, the second output transistor 412 of the battery state monitoring circuit 206c has been also turned on, and hence the second receiving terminal CTLD of the battery state monitoring circuit 206d becomes high level. Accordingly, the second OR circuit 411 outputs the signal of low level to the gate terminal of the second output transistor 412. Then, the second output transistor 412 is turned on, and the second transmitting terminal DO becomes high level. As a result, the second transistor 211 is turned on.

As described above, in the normal state, because the first transistor 209 and the second transistor 211 are turned on, the battery device becomes a chargeable and dischargeable state.

Next, description is given on a case of an overcharged state, that is, a case where the charger is connected between the first external terminal 201 and the second external terminal 202 to thereby charge the batteries 203a to 203d, and at least one voltage of the batteries 203a to 203d becomes equal to or higher than the overcharge voltage. Note that the case where the voltage of the battery 203c becomes equal to or higher than the overcharge voltage is described below.

In this case, the overcharge detection circuit 404 of the battery state monitoring circuit 206c outputs the overcharge detection signal of high level to the first OR circuit 406. Then, the first OR circuit 406 outputs the signal of high level to the gate terminal of the first output transistor 407. Accordingly, the first output transistor 407 is turned off, and the first transmitting terminal CO becomes high impedance.

On this occasion, the first receiving terminal CTLC of the battery state monitoring circuit 206d is pulled down to low level by means of the first current source 408, and the signal of high level is input to the first OR circuit 406. Then, the first OR circuit 406 outputs the signal of high level to the gate terminal of the first output transistor 407. Accordingly, the first output transistor 407 is turned off.

When the first output transistor 407 is turned off, the gate terminal of the first transistor 209 becomes low level by means of the first resistive element 210, and then the first transistor 209 is turned off. As a result, the charge from the charger is inhibited.

As described above, when the overcharge detection signal output from the battery state monitoring circuit corresponding to the battery that has become the overcharged state reaches the battery state monitoring circuit 206d provided at the lowermost stage, the first transistor 209 is turned off. As a result, the charge from the charger is inhibited.

Next, description is given on a case of an overdischarged state, that is, a case where the load is connected between the first external terminal 201 and the second external terminal 202 to thereby discharge the batteries 203a to 203d, and at least one voltage of the batteries 203a to 203d becomes lower than the overdischarge voltage. Note that the case where the voltage of the battery 203c becomes lower than the overdischarge voltage is described below.

In this case, the overdischarge detection circuit 405 of the battery state monitoring circuit 206c outputs the overdischarge detection signal of high level to the second OR circuit 411. Then, the second OR circuit 411 outputs the signal of high level to the gate terminal of the second output transistor 412. Accordingly, the second output transistor 412 is turned off, and the second transmitting terminal DO becomes high impedance.

On this occasion, the second receiving terminal CTLD of the battery state monitoring circuit 206d is pulled down to low level by means of the second current source 413, and the signal of high level is input to the second OR circuit 411. Then, the second OR circuit 411 outputs the signal of high level to the gate terminal of the second output transistor 412. Accordingly, the second output transistor 412 is turned off.

When the second output transistor 412 is turned off, the gate terminal of the second transistor 211 becomes low level by means of the second resistive element 212, and then the second transistor 211 is turned off. As a result, the discharge to the load is inhibited.

As described above, when the overdischarge detection signal output from the battery state monitoring circuit corresponding to the battery that has become the overdischarged state reaches the battery state monitoring circuit 206d provided at the lowermost stage, the second transistor 211 is turned off. As a result, the discharge to the load is inhibited.

The operation described above is performed in a case where the battery voltage is equal to or higher than a circuit operating voltage.

Next, description is given on an operation for securely inhibiting charge in a case where the battery voltage is lower than a voltage with which the first OR circuit 406 circuit is allowed to operate. In the circuit configuration described above, if a power supply voltage decreases to be a voltage with which driving performance of a transistor is not sufficiently secured, a signal output from the first OR circuit 406 becomes undetectable. As a result, an output signal of the first output transistor 407 becomes undetectable.

Figure 4:
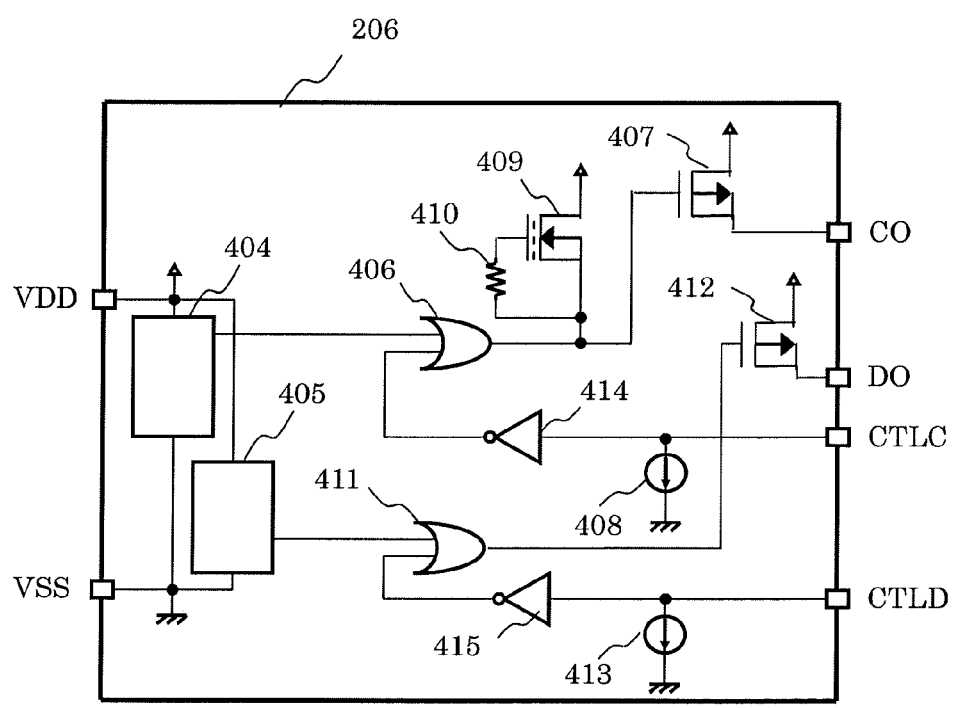
FIG. 4 illustrates a circuit diagram of a battery state monitoring circuit used in the battery device of FIG. 2 according to the present invention.
Figure 5:
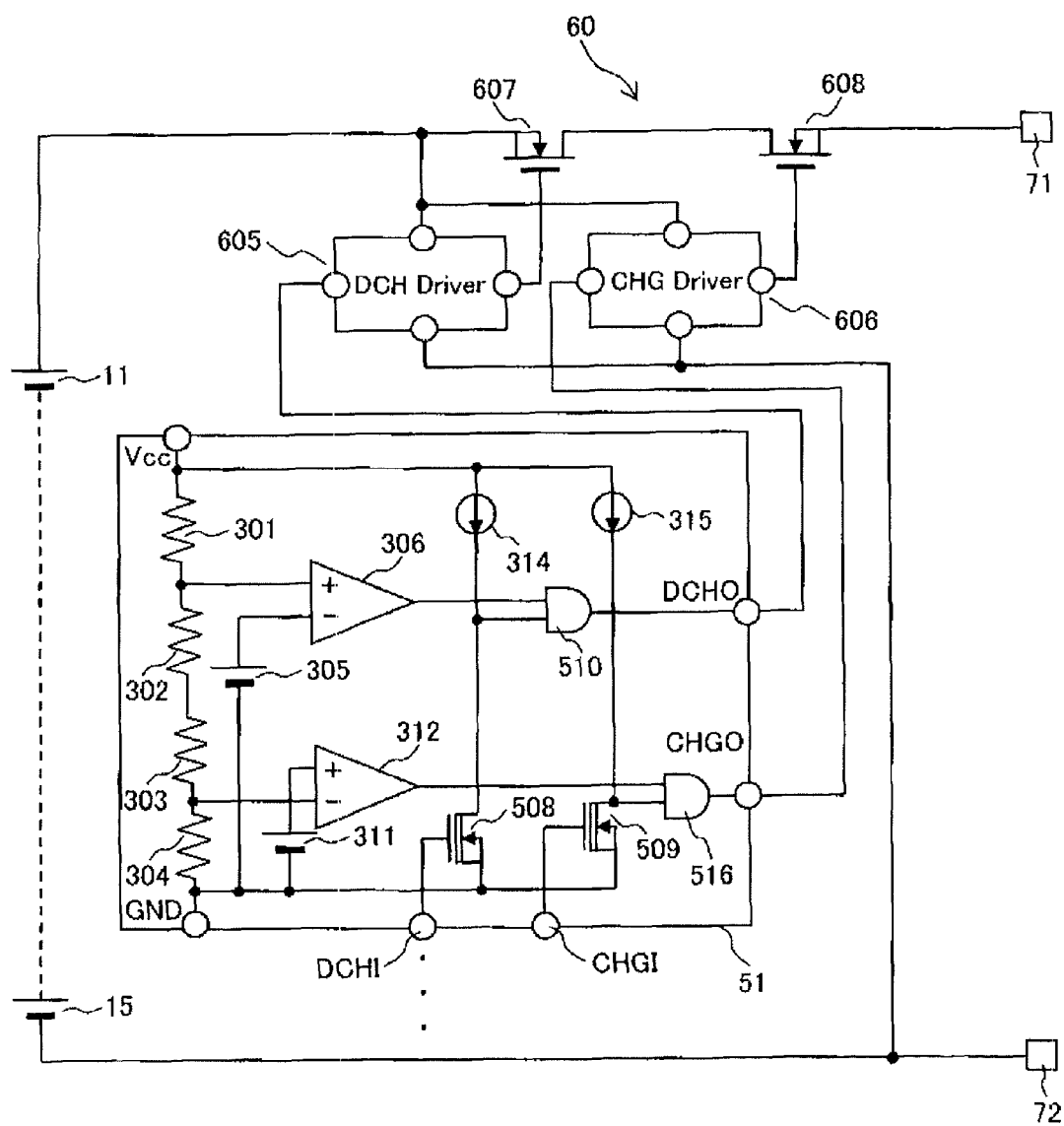
FIG. 5 illustrates a circuit diagram of a conventional battery device.

Therefore, as illustrated in FIG. 4, to form a control circuit that controls the first output transistor 407 to be turned off, the source terminal of the saturation-connected depletion transistor 409 is connected to the gate terminal of the first output transistor 407. In this configuration, when the power supply voltage is lower than the voltage with which the first OR circuit 406 is allowed to operate, it becomes possible to make high level the gate terminal of the first output transistor 407. As a result, it becomes possible to securely turn off the first output transistor 407.

Needless to say, when the first OR circuit 406 operates normally, in order to control the state of the gate terminal of the first output transistor 407, driving performance of an output stage of the first OR circuit 406 needs to be set higher than driving performance of the depletion transistor 409.

Note that the same effect can be expected also in a case where a resistive element is provided instead of the depletion transistor 409 that is saturation-connected by means of the resistor 410, though not illustrated.

What is claimed is:

1. A battery state monitoring circuit, which is to be connected to each of batteries connected in series, and has functions of monitoring a voltage of a corresponding one of the batteries and transmitting/receiving data indicative of monitoring results, the battery state monitoring circuit comprising:
   a first voltage monitoring terminal and a second voltage monitoring terminal that are to be connected to the corresponding one of the batteries;
   a first transmitting terminal;
   a second transmitting terminal;
   a first receiving terminal;
   a second receiving terminal;
   an overcharge detection circuit that detects whether or not the corresponding one of the batteries is in an overcharged state based on a voltage between the first voltage monitoring terminal and the second voltage monitoring terminal, and outputs an overcharge detection signal indicative of a result of the detecting;
   an overdischarge detection circuit that detects whether or not the corresponding one of the batteries is in an overdischarged state based on the voltage between the first voltage monitoring terminal and the second voltage monitoring terminal, and outputs an overdischarge detection signal indicative of a result of the detecting;
   an overcharge information communication circuit that transmits, when at least one of an overcharge detection signal indicative of whether or not another one of the batteries is in the overcharged state, which has been received via the first receiving terminal, and the overcharge detection signal that has been output from the overcharge detection circuit indicates that at least one of the another one of the batteries and the corresponding one of the batteries is in the overcharged state, an overcharge signal indicating that the at least one of the another one of the batteries and the corresponding one of the batteries is in the overcharged state from the first transmitting terminal to an outside; and
   an overdischarge information communication circuit that transmits, when at least one of an overdischarge detection signal indicative of whether or not another one of the batteries is in the overdischarged state, which has been received via the second receiving terminal, and the overdischarge detection signal that has been output from the overdischarge detection circuit indicates that at least one of the another one of the batteries and the corresponding one of the batteries is in the overdischarged state, an overdischarge signal indicating that the at least one of the another one of the batteries and the corresponding one of the batteries is in the overdischarged state from the second transmitting terminal to the outside,
   the overcharge information communication circuit comprising:
   an output transistor that outputs the overcharge detection signal to the first transmitting terminal; and
   a control circuit that controls the output transistor to output the overcharge signal when the voltage of the corresponding one of the batteries becomes lower than a voltage with which the overcharge information communication circuit is allowed to operate,
   the battery state monitoring circuit being formed as one semiconductor device.

2. A battery state monitoring circuit according to claim 1, wherein:
   the output transistor comprises an open-drain output N-channel transistor; and
   the control circuit comprises a pull-down circuit.

3. A battery state monitoring circuit according to claim 2, wherein the pull-down circuit comprises an N-channel depletion transistor including a gate terminal and a source terminal that are saturation-connected with each other.

4. A battery state monitoring circuit according to claim 1, wherein:
   the output transistor comprises an open-drain output P-channel transistor; and
   the control circuit comprises a pull-up circuit.

5. A battery state monitoring circuit according to claim 4, wherein the pull-up circuit comprises an N-channel depletion transistor including a gate terminal and a source terminal that are saturation-connected with each other.

6. A battery device, comprising:
   a first external terminal and a second external terminal that are to be connected to one of a load and a charger;
   a plurality of batteries that are connected in series;
   charge/discharge control switches that are provided between one of the first external terminal and the second external terminal, and the plurality of batteries that are connected in series; and
   the battery state monitoring circuit according to claim 1 that is provided to each of the plurality of batteries.

* * * * *